(12) United States Patent
Ninomiya et al.

(10) Patent No.: US 12,114,054 B2
(45) Date of Patent: Oct. 8, 2024

(54) DRIVING APPARATUS

(71) Applicant: CANON KABUSHIKI KAISHA, Tokyo (JP)

(72) Inventors: Shunsuke Ninomiya, Kanagawa (JP); Ryo Yamasaki, Tokyo (JP); Makoto Oikawa, Kanagawa (JP); Kyouhei Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 18/157,931

(22) Filed: Jan. 23, 2023

(65) Prior Publication Data

US 2023/0247270 A1 Aug. 3, 2023

(30) Foreign Application Priority Data

Feb. 1, 2022 (JP) ................................ 2022-014086

(51) Int. Cl.
 *H04N 23/50* (2023.01)
(52) U.S. Cl.
 CPC .................................. *H04N 23/50* (2023.01)
(58) Field of Classification Search
 CPC ...... H04N 23/50; H04N 23/695; G03B 30/00; G03B 17/561; H02G 3/22; F16M 11/12; F16M 11/18
 See application file for complete search history.

(56) References Cited

U.S. PATENT DOCUMENTS

| | | | | |
|---|---|---|---|---|
| 7,812,507 B2 * | 10/2010 | Takahashi | | H02N 2/108 310/328 |
| 2006/0133786 A1 * | 6/2006 | Teramoto | | H04N 23/687 348/E5.046 |
| 2010/0051774 A1 * | 3/2010 | Shi | | F16M 11/10 248/349.1 |
| 2011/0234041 A1 * | 9/2011 | Kanazawa | | H02N 2/006 310/300 |
| 2017/0048439 A1 * | 2/2017 | von Borcke-Morawitz | | H04N 23/685 |

FOREIGN PATENT DOCUMENTS

JP 2018-205495 A 12/2018

\* cited by examiner

*Primary Examiner* — Yogesh K Aggarwal
(74) *Attorney, Agent, or Firm* — Cowan, Liebowitz & Latman, P.C.

(57) ABSTRACT

A driving apparatus includes a fixed unit, a first movable unit held rotatably about a first axis relative to the fixed unit, a second movable unit held rotatably about a second axis different from the first axis relative to the first movable unit, a bearing configured to support the first movable unit rotatably about the first axis relative to the fixed unit, a first wiring having one end connected to the fixed unit and another end connected to the first movable unit, and a second wiring having one end connected to the fixed unit and another end connected to one of the first movable unit and the second movable unit. The first wiring includes a wound portion wound around the first axis and provided outside the bearing in a radial direction of the bearing. The second wiring is inserted inside the bearing.

12 Claims, 8 Drawing Sheets

PRIOR ART

DRIVING APPARATUS

BACKGROUND

Technical Field

One of the aspects of the disclosure relates to a driving apparatus in which a movable unit is rotatable relative to a fixed unit.

Description of the Related Art

Compact cameras called action cams and wearable cameras have recently been spread. Among such cameras, cameras that can freely change an imaging range by horizontally and vertically rotating a camera unit have been developed and applied to drones (unmanned aerial vehicles) and surveillance cameras.

Japanese Patent Laid-Open No. ("JP") 2018-205495 discloses an image pickup apparatus that includes a support portion that supports a driven unit, and a base portion. A shaft portion provided in the support portion is inserted into a hole portion provided in the base portion, and thereby a base portion rotatably supports the support portion. In addition, the image pickup apparatus described in JP 2018-205495 is configured so that wiring drawn from the driven unit is inserted through a hollow portion in the shaft portion and connected to a control substrate provided on the base portion.

However, in the image pickup apparatus disclosed in JP 2018-205495, there is play (looseness, backlash, or idle space) in the engagement portion between the shaft portion and the hole portion and thus responsiveness lowers in driving the driven unit. In order to improve this problem, if a bearing is used to rotatably support the support portion, the bearing will be provided in an opening through which the wiring is inserted, and there will be no space for inserting the wiring.

SUMMARY

One of the aspects of the disclosure provides a driving apparatus that can secure a space for inserting wiring while improving responsiveness in driving a driven unit.

A driving apparatus according to one aspect of the disclosure includes a fixed unit, a first movable unit held rotatably about a first axis relative to the fixed unit, a second movable unit held rotatably about a second axis different from the first axis relative to the first movable unit, a bearing configured to support the first movable unit rotatably about the first axis relative to the fixed unit, a first wiring having one end connected to the fixed unit and another end connected to the first movable unit; and a second wiring having one end connected to the fixed unit and another end connected to one of the first movable unit and the second movable unit. The first wiring includes a wound portion wound around the first axis. The wound portion is provided outside the bearing in a radial direction of the bearing. The second wiring is inserted inside the bearing.

Further features of the disclosure will become apparent from the following description of exemplary embodiments with reference to the attached drawings.

DESCRIPTION OF THE EMBODIMENTS

Figure 1:
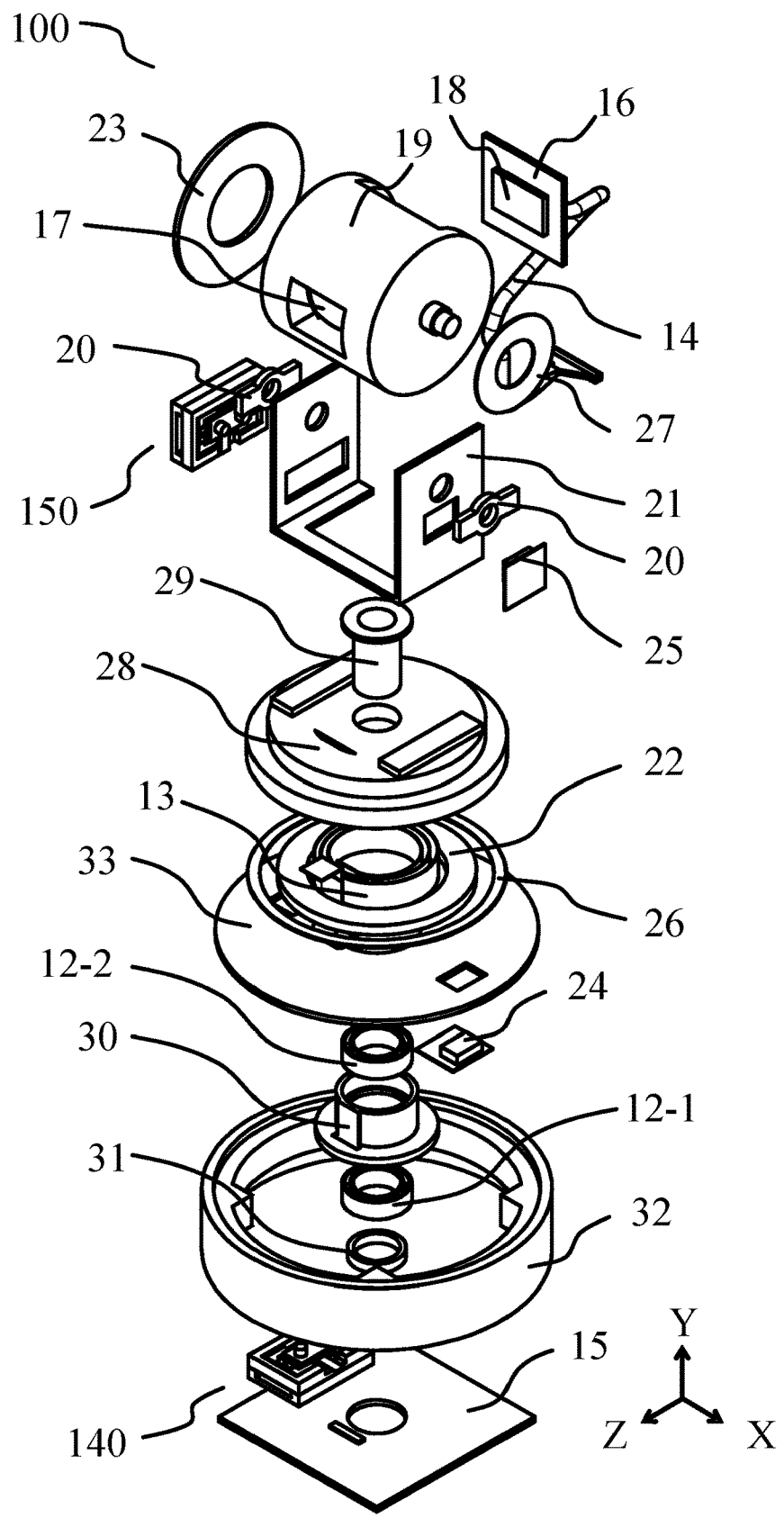
FIG. 1 is an exploded perspective view of a rotationally driving apparatus according to a first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

A description will now be given of a rotationally driving apparatus (driving apparatus) 100 according to a first embodiment of the disclosure.

Figure 2A:
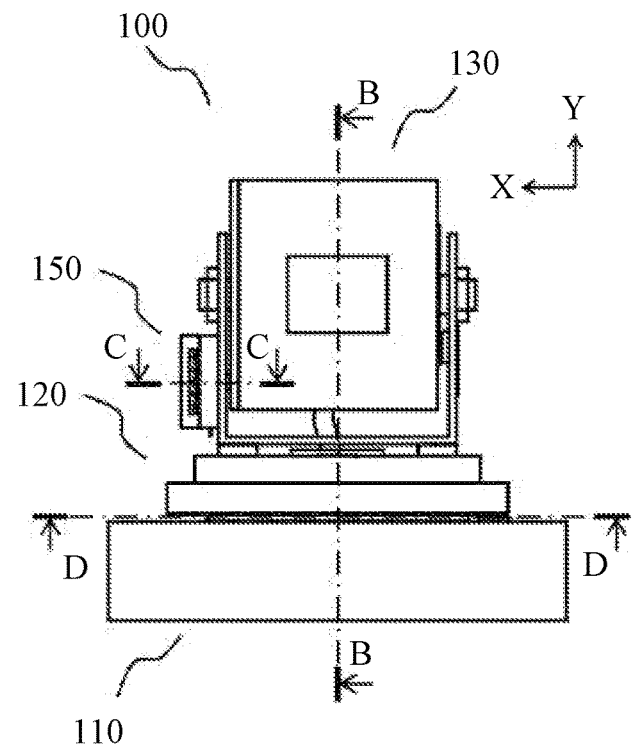
FIGS. 2A and 2B are front and side views of the rotationally driving apparatus according to the first embodiment.
Figure 2B:
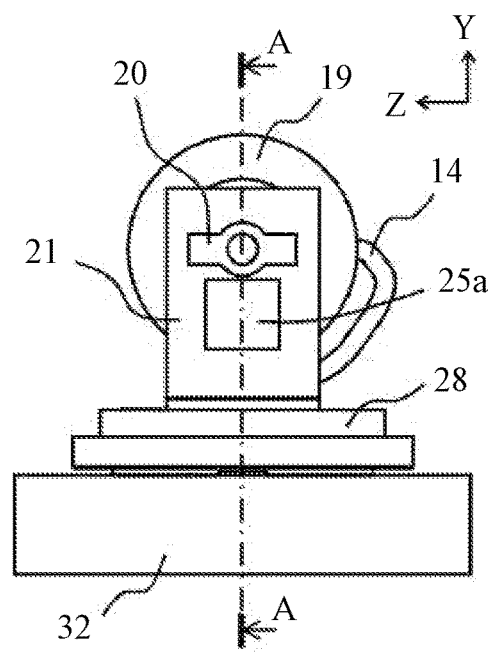
Figure 3A:
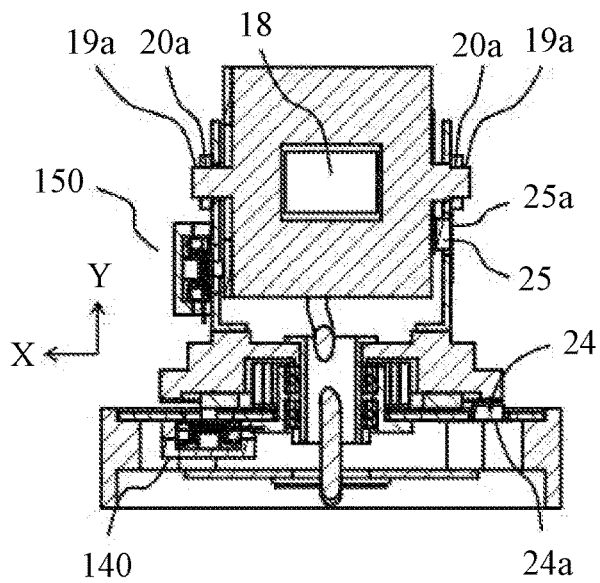
FIGS. 3A and 3B are sectional views of the rotationally driving apparatus according to the first embodiment.
Figure 3B:
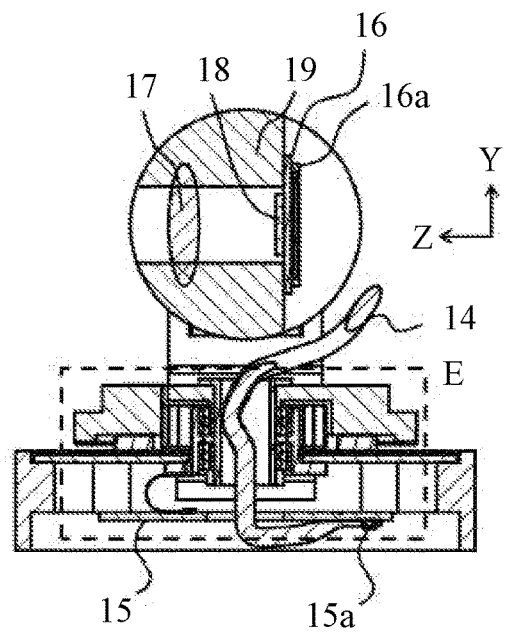

Referring now to FIG. 1, a description will be given of an overall configuration of the rotationally driving (or rotating) apparatus 100 according to the first embodiment. FIG. 1 is an exploded perspective view of the rotationally driving apparatus 100. FIG. 2A is a front view of the rotationally driving apparatus 100, and FIG. 2B is a side view of the rotationally driving apparatus 100. FIGS. 3A and 3B are sectional views of the rotationally driving apparatus 100. FIG. 3A is a sectional view taken along a line A-A in FIG. 2B, and FIG. 3B is a sectional view taken a line B-B in FIG. 2A. The rotationally driving apparatus 100 includes a fixed unit 110, a first movable unit 120, and a second movable unit 130. The first movable unit 120 is held by the fixed unit 110 so as to be rotatable about the Y-axis (first axis) relative to the fixed unit 110, and the second movable unit 130 is held by the first movable unit 120 so as to be rotatable about the X-axis (a second axis different from the first axis) relative to the first movable unit 120. The rotatably supporting mechanism will be described below.

The fixed unit 110 includes a first vibration wave motor (first driving unit) 140, and due to the driving force generated by the first vibration wave motor 140, the first movable unit 120 is rotated about the Y-axis relative to the fixed unit 110. The first movable unit 120 includes a second vibration wave motor (second driving unit) 150, and due to the driving force generated by the second vibration wave motor 150, the second movable unit 130 is rotated about the X-axis relative to the first movable unit 120. Thereby, due to the driving forces of the first vibration wave motor 140 and the second vibration wave motor 150, the second movable unit 130 can be rotated about the Y-axis and the X-axis relative to the fixed unit 110.

The rotationally driving apparatus 100 is an image pickup apparatus that includes an image sensor 18. The second movable unit 130 includes a lens 17 and the image sensor 18 and can capture an object. As described above, the second movable unit 130 can be rotated about the X-axis and the Y-axis, and can capture objects in a variety of directions.

A description will now be given of a rotationally driving mechanism of the second movable unit 130 according to this embodiment. The second movable unit 130 includes a second rotating member 19, and the second rotating member 19 includes an imaging substrate 16 mounted with an image sensor 18, and the lens 17. For simplified description, the lens 17 is illustrated as a single lens, but is actually an imaging optical system that includes a plurality of lenses. The imaging optical system may include a lens that can be driven by an unillustrated driving apparatus, and may include an autofocus (AF) function and an image stabilizing function.

The first movable unit 120 includes a holding sheet metal 21 that is a U-shaped sheet metal member, and the holding sheet metal 21 includes shaft support members 20. Each shaft support member 20 has a hole portion 20a engaged with a shaft portion 19a of the second rotating member 19. Thereby, the second rotating member 19 is fixed to the holding sheet metal 21 via the shaft support members 20. Due to the engagement between the shaft portion 19a and the hole portions 20a, the second rotating member 19 is rotatably supported on the holding sheet metal 21 about the X-axis. That is, the second movable unit 130 is supported by the first movable unit 120 so as to rotate about the X-axis relative to the first movable unit 120.

Figure 4A:
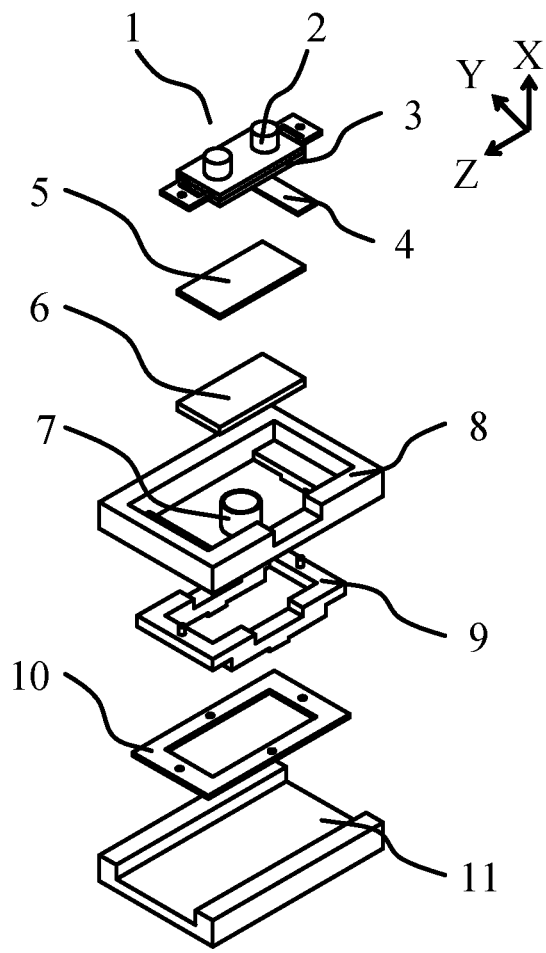
FIGS. 4A and 4B are an exploded perspective view and a sectional view of a vibration wave motor according to the first embodiment.
Figure 4B:
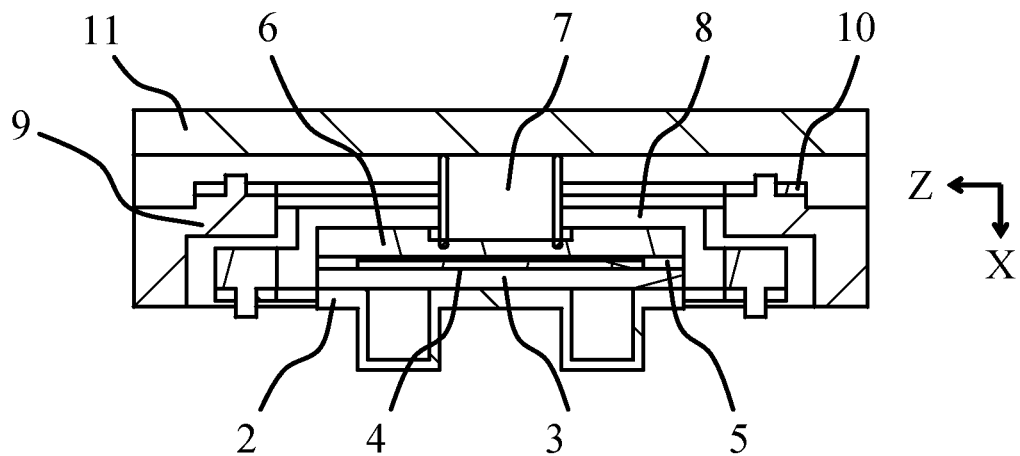

The first movable unit 120 includes the second vibration wave motor 150 for rotationally driving the second movable unit 130. FIGS. 4A and 4B illustrate a configuration of the second vibration wave motor 150 of the rotationally driving apparatus 100. FIG. 4A is an exploded perspective view of the second vibration wave motor 150, and FIG. 4B is a sectional view taken along a line C-C in FIG. 2A.

A vibrator 1 includes a vibrating plate 2 and a piezoelectric element 3. The vibrating plate 2 is a plate-shaped member having two projections, and the vibrating plate 2 and the piezoelectric element 3 are fixed by an adhesive material or the like. A high-frequency signal is supplied to the piezoelectric element 3 from a motor flexible printed circuit (FPC) 4 connected to the piezoelectric element 3. Thereby, the piezoelectric element 3 expands and contracts. Bending deformation is generated in the vibrator 1 due to expansion and contraction of the piezoelectric element 3. In a case where the vibrator 1 generates a predetermined bending deformation, an elliptical motion is generated at the tip of each projection of the vibrator 1.

A pressure spring 7 presses the vibrator 1 against a second friction member 23 fixed to the second rotating member 19 via a pressure plate 6 and a shock absorbing member 5. The pressure plate 6 allows the pressing force of the pressure spring 7 to be applied to the vibrator 1 uniformly rather than locally. By providing the shock absorbing member 5 between the vibrator 1 and the pressure plate 6, the vibration of the vibrator 1 can be prevented from being attenuated by direct contact between the pressure plate 6 and the vibrator 1. A high-frequency signal is input to the piezoelectric element 3 while the vibrator 1 is pressed against the second friction member 23 by the pressure spring 7 and thereby the above elliptical motion is generated. Thereby, a frictional force is generated between the vibrator 1 and the second friction member 23, and the frictional force causes the vibrator 1 and the second friction member 23 to move relative to each other.

The vibrator 1 is fixed to a base 8 by an unillustrated adhesive material or the like. The base 8 and the holding member 9 are connected via a connecting member 10. The connecting member 10 is a plate-shaped member, and has flexibility in the pressure direction of the vibrator 1 and high rigidity in a direction orthogonal to the pressure direction. A pressure receiving member 11 is a member that receives the pressure reaction force of the pressure spring 7, and both the connecting member 10 and the pressure receiving member 11 are fixed to the holding sheet metal 21. As described above, the connecting member 10 is flexible in the pressing direction of the vibrator 1, and thus deforms in a case where there is a positional error in the pressing direction between the vibrator 1 and the second friction member 23. Thereby, the positional error in the pressing direction can be absorbed.

Since the vibrator 1 is fixed to the holding sheet metal 21 via the connecting member 10 and the holding member 9, even in a case where the driving force is generated between the vibrator 1 and the second friction member 23, the vibrator 1 is not moved in the direction orthogonal to the pressing direction by the reaction force and is held. The above driving force acts on the second friction member 23 in the Z direction. Since the second rotating member 19 to which the second friction member 23 is fixed is rotatably supported about the X-axis relative to the holding sheet metal 21, the second friction member 23 and the second rotating member 19 are rotationally driven about the X-axis due to the driving force generated in the Z direction.

The second rotating member 19 includes a second scale 27, and the holding sheet metal 21 includes a second sensor (position detecting unit) 25. The second sensor 25 can detect a position of the second scale 27 of the second movable unit 130. This configuration can detect a rotating amount of the second rotating member 19 relative to the holding sheet metal 21. The second sensor 25 outputs an electric signal corresponding to the position of the second scale 27, and can detect the position of the second scale 27 by reading the electric signal. A sensor FPC 25a of the second sensor 25 is electrically connected to a wound FPC (first wiring) 13, which will be described below, through an unillustrated connecting member. A first rotating member 28 includes a first scale 26 and a fixed sheet metal 33 includes a first sensor 24, and the first sensor 24 can detect the position of the first scale 26. This configuration can detect a rotating amount of the first rotating member 28 relative to the fixed sheet metal 33. The first sensor 24 outputs an electric signal corresponding to the position of the first scale 26, and can detect the position of the first scale 26 by reading the electric signal. The sensor FPC 24a of the first sensor 24 is electrically connected to a control board 15 through an unillustrated connecting member.

Figure 5:
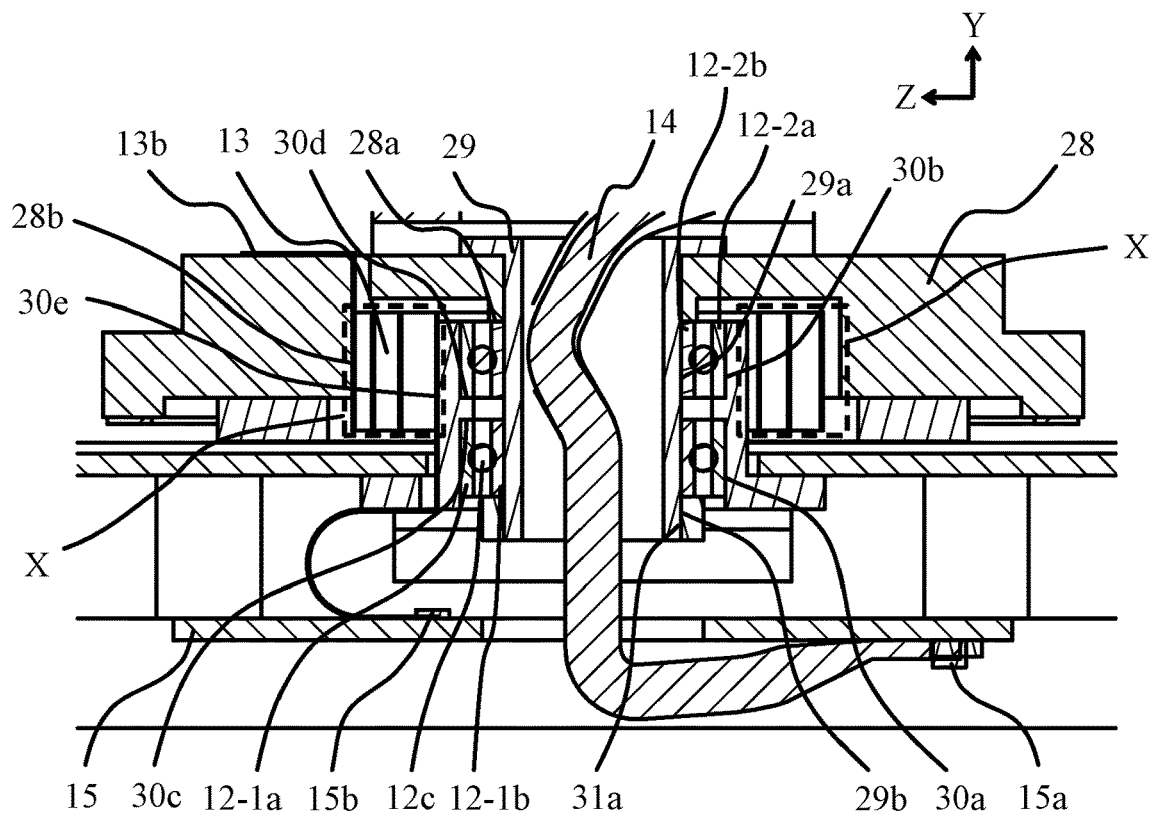
FIG. 5 is a detailed sectional view of the rotationally driving apparatus according to the first embodiment.

A description will now be given of the rotationally driving mechanism for the first movable unit 120 according to this embodiment. FIG. 5 is a detailed enlarged view of an area E in FIG. 3B. Bearings 12 are members that rotatably support the first movable unit 120 relative to the fixed unit 110. The first movable unit 120 includes the two bearings 12, labeled as bearings 12-1 and 12-2. The fixed unit 110 includes a fixed member 32, and a fixed sheet metal 33 is fixed to the fixed member 32. The fixed sheet metal 33 includes a bearing holding member 30, and outer rings 12-1a and 12-2a of the two bearings 12-1 and 12-2 are engaged with engagement portions 30a and 30b of the bearing holding member 30, respectively. The outer rings 12-1a and 12-2*a* of the bearings 12-1 and 12-2 contact receiving surfaces 30*c* and 30*d* of bearing holding member 30, respectively. Each bearing 12 includes an inner ring 12*b* having a first rolling surface, an outer ring 12*a* provided outside the bearing 12 in the radial direction from the inner ring 12*b* and having a second rolling surface, balls 12*c* provided between the first rolling surface and the second rolling surface. As the balls 12*c* can roll between the first rolling surface and the second rolling surface, the outer ring 12*a* and the inner ring 12*b* can rotate smoothly without sliding.

The first movable unit 120 includes the first rotating member 28, the holding sheet metal 21 is fixed to the first rotating member 28, and the second movable unit 130 is rotatably supported by the holding sheet metal 21. The first rotating member 28 includes a hollow member 29 having a hollow portion, and a cylindrical portion 29*a* of the hollow member 29 is engaged with (fitted in or inserted into) the inner ring 12*b* of each bearing 12. A threaded portion 29*b* is provided at the tip of the hollow member 29 and is screwed with a threaded portion 31*a* provided inside a bearing fixing member 31. The bearing fixing member 31 contacts the inner ring 12-1*b* of the bearing 12-1, and applies a preload to the inner ring 12-1*b* by tightening the bearing fixing member 31 against the hollow member 29 with a predetermined force.

The inner ring 12-2*b* of the bearing 12-2 contacts the receiving surface 28*a* of the first rotating member 28, and the inner ring 12-2*b* and the first rotating member 28 are integrally movable. A preload applied by the bearing fixing member 31 acts on the bearing holding member 30 via the bearing 12-1, the bearing holding member 30, the bearing 12-2, and the first rotating member 28. As described above, since the bearing fixing member 31 and the hollow member 29 are screwed together, the preload force is configured to close between the bearing fixing member 31 and the hollow member 29. A preload is also applied between the outer ring 12*a* and the inner ring 12*b* of each of the two bearings 12 in the Y direction as the rotating axis direction, so that there is no play between the outer ring 12*a* and the inner ring 12*b*.

While the structure in which the inner ring 12-2*b* of the bearing 12-2 contacts the first rotating member 28 has been described, the inner ring 12-2*b* may directly contact the bearing holding member 30 to prevent the preload from applying to the first rotating member 28. This embodiment has discussed a preloading method at a fixed position in which preload is applied to the bearing 12 by the tightening force of the bearing fixing member 31, but may use a preloading method for applying the preload as constant pressure through a spring or the like.

The outer ring 12*a* of each bearing 12 is fixed to the fixed sheet metal 33 via the bearing holding member 30, and the inner ring 12*b* is configured to move integrally with the first rotating member. That is, the inner ring 12*b* is fixed to the first movable unit 120, and the outer ring 12*a* is fixed to the fixed unit 110. Due to this configuration, the first movable unit 120 including the first rotating member 28 is supported by the fixed unit 110 so as to be rotatable about the Y-axis relative to the fixed unit 110 including the fixed sheet metal 33.

The fixed unit 110 includes the first vibration wave motor 140 for rotationally driving the first movable unit 120. Since the first vibration wave motor 140 is configured similarly to the second vibration wave motor 150 described above, a description thereof will be omitted.

The first rotating member 28 includes a first friction member 22, and the frictional force between the vibrator 1 of the first vibration wave motor 140 and the first friction member 22 of the first rotating member 28 provides the first rotating member 28 with a driving force in the Z-axis direction. Since the first rotating member 28 is supported by the fixed sheet metal 33 so as to be rotatable about the Y-axis relative to the fixed sheet metal 33, the driving force of the first vibration wave motor 140 rotationally drives the first rotating member 28 about the Y-axis.

As described above, in the first embodiment, the first movable unit 120 is rotationally driven about the Y-axis relative to the fixed unit 110 by the first vibration wave motor 140. The second movable unit 130 is rotationally driven about the X-axis relative to the first movable unit 120 by the second vibration wave motor 150. Thereby, objects can be captured in a variety of directions by rotating the lens 17 and the image sensor 18 provided to the second movable unit 130 about two orthogonal axes.

Figure 6:
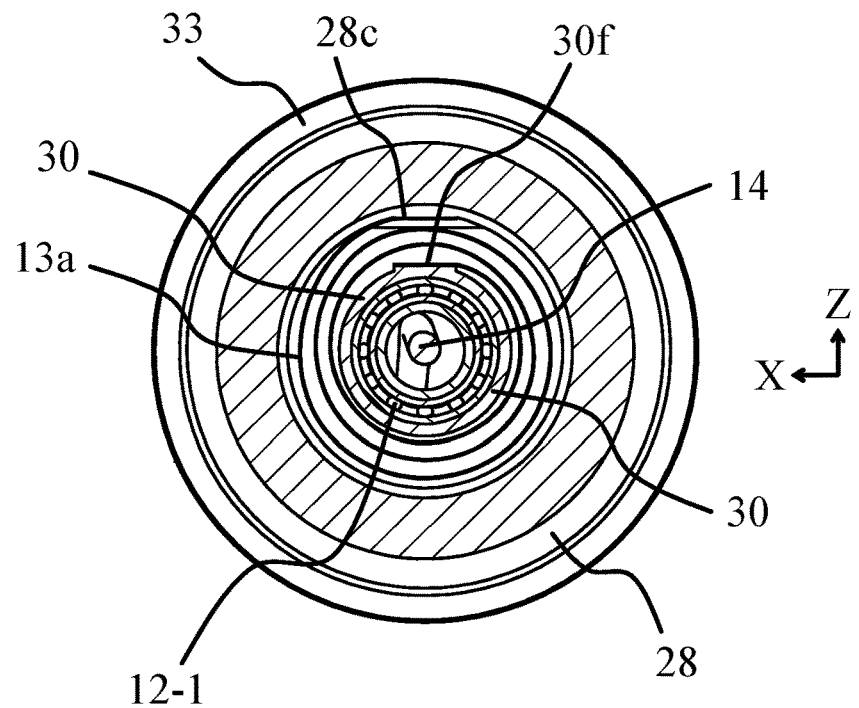
FIG. 6 is a sectional view of the rotationally driving apparatus according to the first embodiment.

A description will now be given of the wiring placement of wiring according to the first embodiment. FIG. 6 is a sectional view of the rotationally driving apparatus 100 taken along a line D-D in FIG. 2A.

The control board 15 includes a CPU, memory, etc. that perform image processing, and a driver IC that controls the driving of the first vibration wave motor 140 and the second vibration wave motor 150. The control board 15 is fixed to the fixed member 32 of the fixed unit 110. The control board 15 is illustrated as a single substrate in this embodiment, but may be divided into a plurality of substrates. The imaging substrate 16 is a substrate that includes the image sensor 18, converts an optical signal received by the image sensor 18 into an electrical signal, and outputs it as a video signal. The imaging substrate 16 also includes a driver IC for controlling of an unillustrated AF driving apparatus for realizing the AF function and an unillustrated image stabilizing apparatus for realizing the image stabilizing function.

A coaxial cable (second wiring) 14 is a wiring group in which a plurality of wire cables are bundled. One end of the coaxial cable 14 is connected to a connector 15*a* of the control board 15 of the fixed unit 110, and the other end of the coaxial cable 14 is connected to the connector 16*a* of the imaging substrate 16 fixed to the second movable unit 130 through the inside of each bearing 12. A video signal acquired by the image sensor 18 and a driving signal of each driving system, such as the AF mechanism and the image stabilizing mechanism, are transmitted through the coaxial cable 14. The coaxial cable 14 is set to a proper length so that an excessive or insufficient length does not cause a large load in a case where the second movable unit 130 is rotationally driven within a preset movable range. This embodiment has described an example in which the coaxial cable 14 is fixed to the second movable unit 130, but the coaxial cable 14 may be fixed to the first movable unit 120 and then connected to the imaging substrate 16.

A wound FPC 13 is a flexible wiring board, one end of which is connected to a connector 15*b* of the control board 15 of the fixed unit 110, and the other end of which is fixed to the first rotating member 28. The wound FPC 13 plays a role of transmitting the driving signal of the second vibration wave motor 150 and the position detecting signal of the second sensor 25 to the control board 15. The leader portion 13*b* of the wound FPC 13 is fixed to the first rotating member 28, and electrically connected to a motor FPC 4 of the second vibration wave motor 150, the sensor FPC 25*a* of the second sensor 25 through an unillustrated connecting unit. The wound FPC 13, the motor FPC 4, and the sensor FPC 25*a* may be integrated, or the motor FPC 4 and the sensor FPC 25*a* may be connected via a connector provided on the wound FPC 13.

The wound FPC 13 includes a wound portion 13a spirally wound around the rotation axis of the first rotating member 28 in a space X between an inner wall 28b of the first rotating member 28 and an outer wall 30e of the bearing holding member 30. One end of the wound portion 13a is fixed to an FPC fixed surface 28c of the first rotating member 28, and the other end of the wound portion 13a is fixed to an FPC fixed surface 30f of the bearing holding member 30. The length of the wound FPC 13 is properly set so as to allow the wound portion 13a to be tightened or loosened in the space X in a case where the first rotating member 28 is rotationally driven within the preset movable range. Thereby, the would FPC 13 is prevented from receiving a large load.

As described above, the wound portion 13a is provided in the space X between the inner wall 28b of the first rotating member 28 and the outer wall 30e of the bearing holding member 30. That is, the wound portion 13a of the wound FPC 13 is provided outside each bearing 12 and the bearing holding member 30 in the radial direction.

The wound portion 13a is provided between the first vibration wave motor 140 and each bearing 12 on the ZX plane. By providing the wound FPC 13 outside of the bearing 12 and passing the coaxial cable 14 through the inside of each bearing 12, the wound FPC 13 and the coaxial cable 14 do not interfere with each other. In this configuration, the wound portion 13a of the wound FPC 13 is provided so as to at least partially overlap the first vibration wave motor 140 in the Y-axis direction as the rotation axis direction, the rotationally driving apparatus 100 can be made smaller in the Y-axis direction.

This embodiment has discussed an example in which the inner ring 12b of each bearing 12 moves integrally with the first rotating member 28 of the first movable unit 120, and the outer ring 12a is fixed to the bearing holding member 30 of the fixed unit 110. In one modification, a movable and fixed relationship is reversed to set the inner ring 12b of each bearing 12 to the fixed side and the outer ring 12a to the movable side.

Figure 7A:
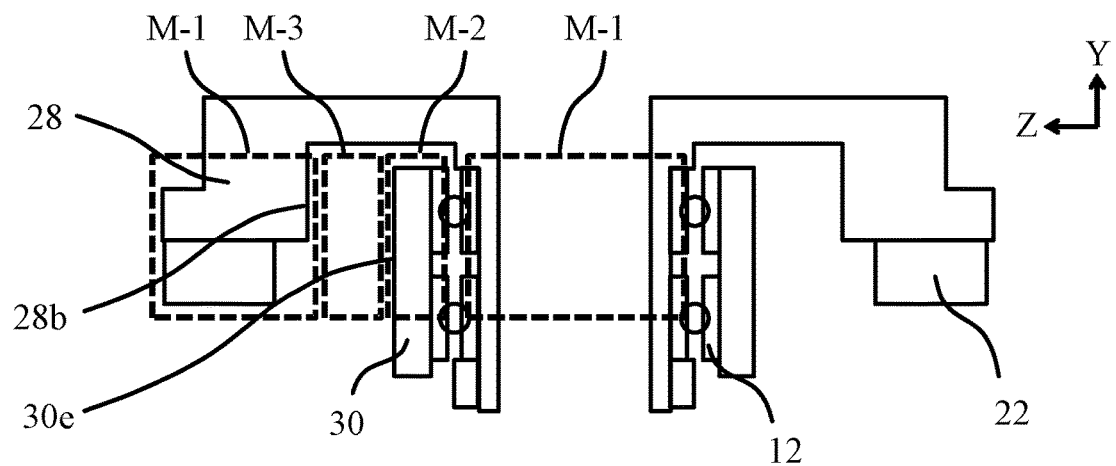
FIGS. 7A and 7B illustrate a configuration different from the rotationally driving apparatus according to the first embodiment.
Figure 7B:
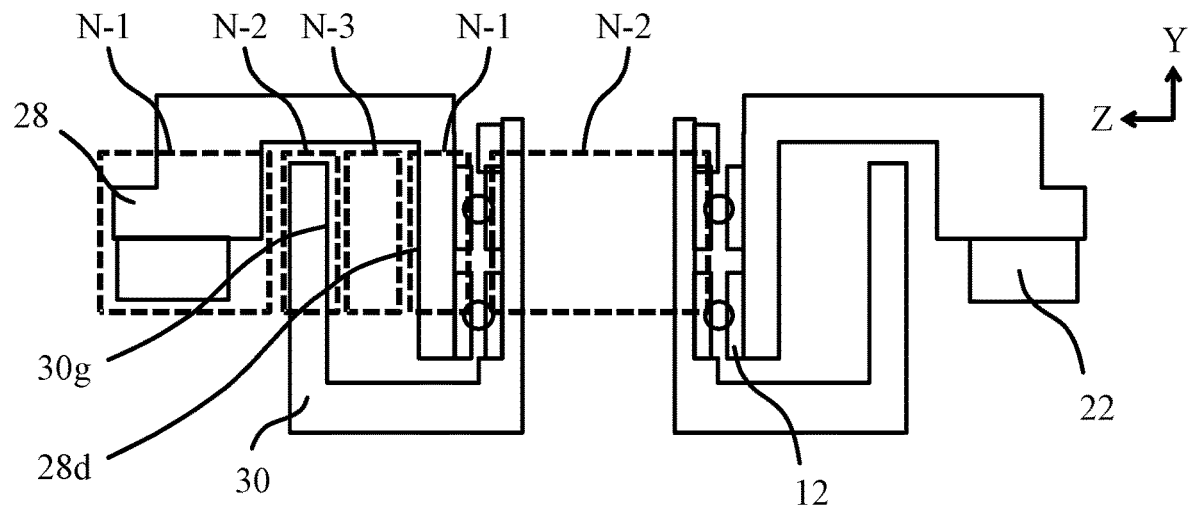

FIG. 7A schematically illustrates a configuration in which the inner ring 12b is set to the movable side and the outer ring 12a is set to the fixed side. FIG. 7B schematically illustrates a configuration in which the inner ring 12b is set to the fixed side and the outer ring 12a is set to the movable side. For convenience, the configuration of FIG. 7A will be referred to as configuration M, and the configuration of FIG. 7B will be referred to as configuration N. In each figure, some elements are omitted. In each figure, each of areas M-1 and N-1 represents a movable unit that includes the first rotating member 28, etc., each of areas M-2 and N-2 represents a fixed unit that includes the bearing holding member 30, etc. Each of areas M-3 and N-3 represents a space in which the wound portion 13a of the wound FPC 13 is provided. Each of areas M-3 and N-3 corresponds to the space X in FIG. 5.

As described above, as the first rotating member 28 rotates, the wound portion 13a of the wound FPC 13 loosened or tightened in the space X between the inner wall 28b of the first rotating member 28 and the outer wall 30e of the bearing holding member 30. That is, it is necessary to provide walls such as the inner wall 28b and the outer wall 30e inside and outside the wound portion 13a. In the configuration N, the wound portion 13a is provided in the area N-3 between a wall portion (inner wall) 30g of the bearing holding member 30 and a wall portion (outer wall) 28d of the first rotating member 28.

The configuration M and configuration N are common in that the first friction member 22 is provided on the outermost side. In configuration M, the bearing holding member 30 and the outer wall 30e are provided outside each bearing 12. In configuration M, since the first rotating member 28 that holds the first friction member 22 is provided outside each bearing 12, an inner wall 28b is provided on the inner side. On the other hand, in the configuration N, the first rotating member 28 and the outer wall 28d are provided outside each bearing 12. The configuration N needs a surface for receiving the wound portion 13a outside the outer wall 28d on the bearing holding member 30, which is a member on the fixed side. Thus, the area M-1 formed by the first rotating member 28 may be located outside the area M-3 in the configuration M, whereas the areas N-1 and N-2 need to be located outside the area N-3 in the configuration N. Hence, the configuration M can be smaller than the configuration N in the radial direction.

Figure 8:
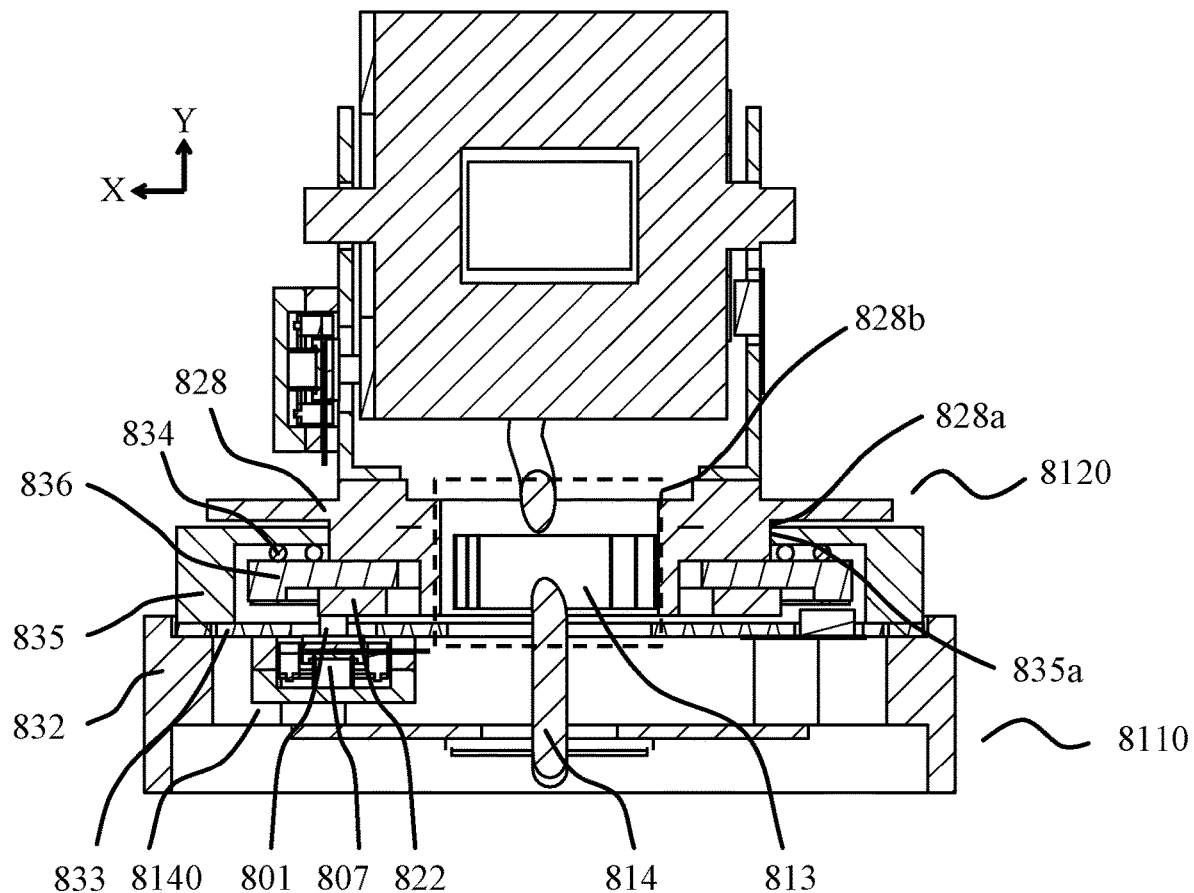
FIG. 8 is a sectional view of a conventional rotationally driving apparatus.

Referring now to FIG. 8, a description will be given of the prior art configuration. A description common to that of the first embodiment will be omitted, and only differences will be described.

A connection member 836 is fixed to a first rotating member 828, and a first friction member 822 is fixed to the connection member 836. As in the first embodiment, the first rotating member 828 is rotationally driven by a vibrator 801 of a first vibration wave motor 8140 and a frictional force of the first friction member 822 as a driving force. A plurality of rolling balls 834 are provided so as to contact the connection member 836, and a rolling receiving member 835 is provided opposite to the connection member 836. The rolling receiving member 835 is fixed to a fixed member 832 via a fixed sheet metal 833. Since the rolling balls 834 receive the pressure force of a pressure spring 807 of the first vibration wave motor 8140, the first rotating member 828 can be smoothly rotated without increasing the sliding load. Since an engagement portion 835a of the rolling receiving member 835 is engaged with a cylindrical portion 828a of the first rotating member 828, the first rotating member 828 is prevented from moving relative to the fixed member 832 within the XZ plane. That is, the engagement portion 835a on the rolling receiving member 835 of a fixed unit 8110 and the cylindrical portion 828a on the first rotating member 828 of a first movable unit 8120 are slidably engaged. The wound FPC 813 and the coaxial cable 814 are configured to pass through an opening 828b in the first rotating member 828.

A description will now be given of the effects obtained by the first embodiment. In the prior art configuration, the cylindrical portion 828a on the first movable unit 8120 is slidably engaged with the engagement portion 835a on the fixed unit 8110, and the first movable unit 8120 is rotatably supported relative to the fixed unit 8110. Hence, the prior art configuration has engagement play between the engagement portion 835a and the cylindrical portion 828a such that an inoperable dead band area, for example, is created and the responsiveness becomes lowered. If a shaft support structure such as a bearing is provided to improve this problem, the space of the opening 828b in the first rotating member 828 through which the wound FPC 813 and the coaxial cable 814 are inserted cannot be secured. Therefore, there is no space for inserting the wound FPC 813 and the coaxial cable 814.

On the other hand, in the first embodiment, the first movable unit 120 is rotatably supported by each bearing 12 relative to the fixed unit 110, and no play is generated in each bearing 12 by applying the preload caused by tightening the bearing fixing member 31. In addition, the wound portion 13a of the wound FPC 13 is provided outside each bearing 12, and the coaxial cable 14 is configured to pass through the inside of each bearing 12.

Thereby, responsiveness can be improved because a dead zone area or the like does not occur due to the engagement play in a case where the first movable unit 120 as the driven unit is driven. By inserting the coaxial cable 14 into the inner space of each bearing 12 and providing the wound FPC 13 outside each bearing 12, the rotationally driving apparatus 100 can be constructed without increasing its size in the Y-axis direction.

As described above, in the first embodiment, the wound portion 13a of the wound FPC 13 is provided outside each bearing 12, and the coaxial cable 14 is inserted through the inner space of each bearing 12. As a result, a space for inserting the wiring can be secured while the responsiveness can be improved in driving the driven unit.

Second Embodiment

A description will now be given of a rotationally driving apparatus 200 according to a second embodiment of the disclosure. The first embodiment has described an example in which the driving unit that drives the first movable unit 120 is the vibration wave motor.

In the second embodiment, a description will be given of a case where the driving unit that drives the first movable unit 120 is an electromagnetic motor (first driving unit). A description of a matter common to that of the first embodiment will be omitted, and differences from the first embodiment will be explained.

Figure 9:
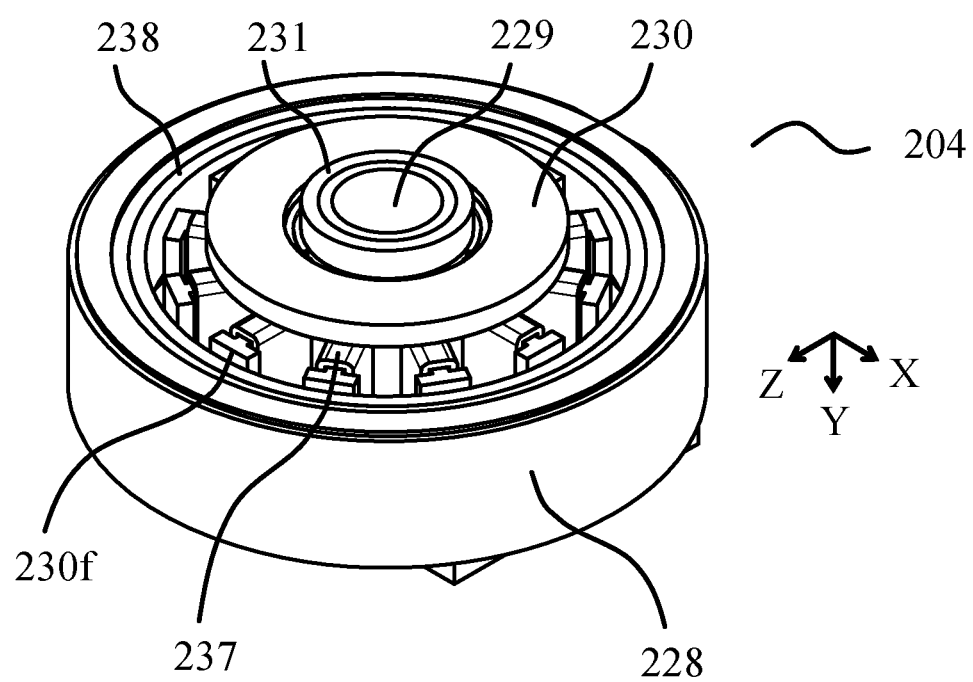
FIG. 9 is a perspective view of an electromagnetic motor in a rotationally driving apparatus according to a second embodiment.
Figure 10:
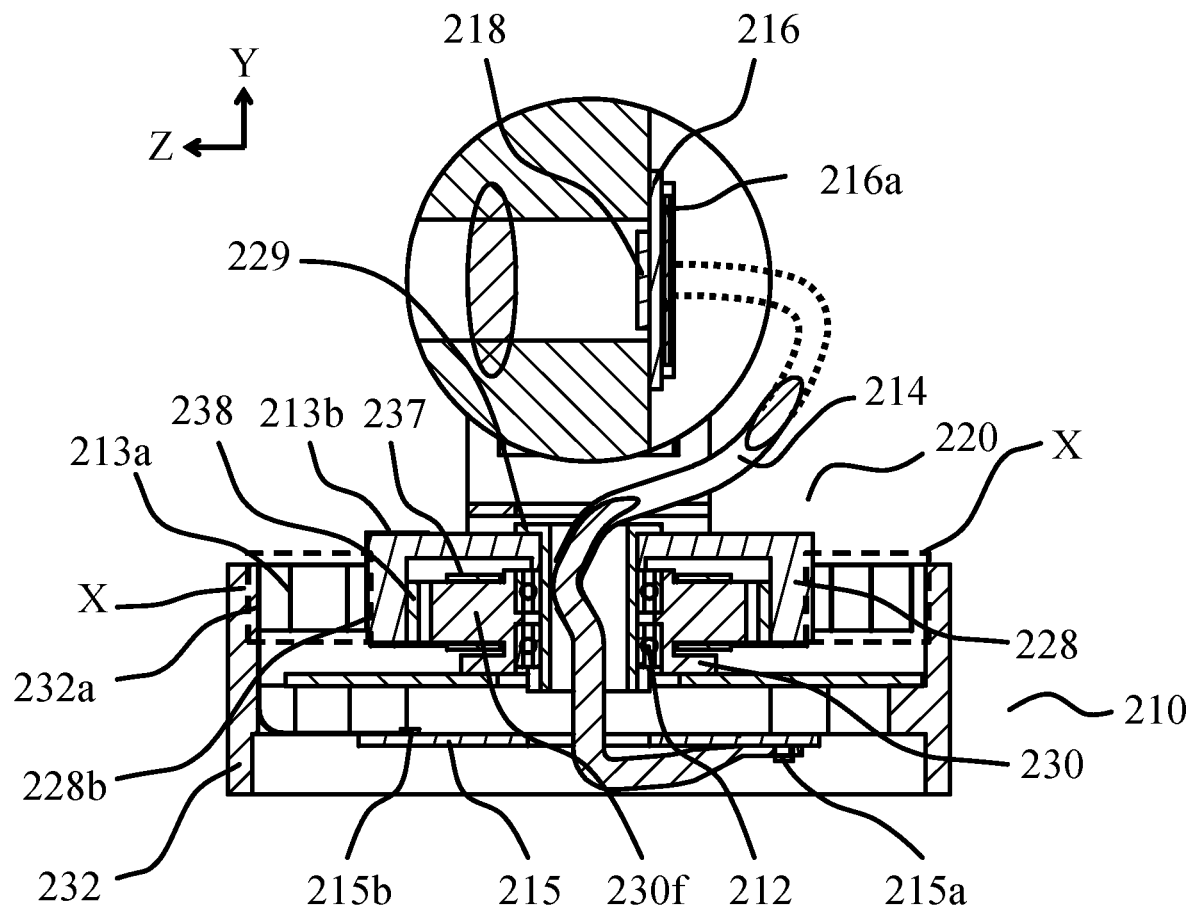
FIG. 10 is a sectional view of the rotationally driving apparatus according to the second embodiment.

FIG. 9 is a perspective view of an electromagnetic motor 204 in the rotationally driving apparatus 200 according to this embodiment. FIG. 10 is a sectional view of the rotationally driving apparatus 200 according to this embodiment, and corresponds to FIG. 3B illustrating the rotationally driving apparatus 100 according to the first embodiment.

The electromagnetic motor 204 includes coils 237 and magnets 238. The configurations of bearings 212 and a bearing holding member 230 and the configuration of the first rotating member 228 are similar to those of the first embodiment. A plurality of wound portions 230f are provided to the bearing holding member 230, and the coils 237 are wound around the wound portions 230f. The coils 237 are divided into three groups, and three-phase AC voltages are applied by an unillustrated power supply unit. The magnets 238 are provided on the first rotating member 228, and a plurality of magnets generate magnetization directions that are different in the circumferential direction. The electromagnetic force generated by the three-phase AC voltage applied to the coils 237 and the magnetic field of the magnets 238 generate an attractive force or a repulsive force that serves as a driving force for rotationally driving the first rotating member 228. Along with this, the first rotating member 228 can be rotationally driven about the Y-axis relative to the bearing holding member 230.

The coaxial cable 214 is inserted into the hollow portion material 229 provided inside the bearing 212 and connected to a connector 216a of an imaging board 216 mounted with the image sensor 218 and a connector 215a of a control board 215. One end (213b) of the wound FPC 213 is fixed to the first rotating member 228 and the other end of the wound FPC 213 is connected to a connector 215b of the control board 215. A wound portion 213a of the wound FPC 213 is spirally wound in the space X between an outer wall 228b of the first rotating member 228 and an inner wall 232a of the fixed member 232. That is, the wound portion 213a is provided outside the electromagnetic motor 201 in the radial direction of the bearings 212. As the first rotating member 228 rotates, the wound portion 213a is tightened or loosened and the wound FPC 213 is prevented from receiving a large load.

In this embodiment, as in the first embodiment, the first movable unit 220 is rotatably supported by the bearings 212 relative to the fixed unit 210. In addition, two bearings 212 are provided, and the bearings 212 are configured so as not to produce play by applying the preload caused by tightening the bearing fixing member 231.

Thereby, responsiveness can be improved because a dead zone area or the like does not occur due to the engagement play in a case where the first movable unit 220 as the driven unit is driven. By inserting the coaxial cable 214 into the inner space of each bearing 212 and providing the wound FPC 213 outside each bearing 212, the rotationally driving apparatus 200 can be constructed without increasing its size in the Y-axis direction. In particular, in this embodiment, the area inside the first rotating member 228 is occupied by the coils 237 and the magnets 238. Therefore, by providing the wound portion 213a in the area outside the first rotating member 28 and inside the fixed member 232, the rotationally driving apparatus 200 can be made smaller in the Y-axis direction.

As described above, this embodiment provides the wound portion 213a of the wound FPC 213 outside the bearings 212 and passes the coaxial cable 214 through the inside of the bearings 212. As a result, a space can be secured for inserting the wiring and the responsiveness can be improved in driving the driven unit.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-014086, filed on Feb. 1, 2022, which is hereby incorporated by reference herein in its entirety.

What is claimed is:

1. A driving apparatus comprising:
   a fixed unit;
   a first movable unit held rotatably about a first axis relative to the fixed unit;
   a second movable unit held rotatably about a second axis different from the first axis relative to the first movable unit;
   a bearing configured to support the first movable unit rotatably about the first axis relative to the fixed unit;
   a first wiring having one end connected to the fixed unit and another end connected to the first movable unit; and
   a second wiring having one end connected to the fixed unit and another end connected to one of the first movable unit and the second movable unit,
   wherein the first wiring includes a wound portion wound around the first axis,
   wherein the wound portion is provided outside the bearing in a radial direction of the bearing, and
   wherein the second wiring is inserted inside the bearing.

2. The driving apparatus according to claim 1, wherein the first wiring includes a flexible wiring board.

3. The driving apparatus according to claim 1, wherein the second wiring includes a wiring group in which a plurality of wire cables are bundled.

4. The driving apparatus according to claim 1, wherein the wound portion is spirally wound.

5. The driving apparatus according to claim 1, wherein the first movable unit includes a cylindrical portion,
   wherein the cylindrical portion is engaged with the bearing, and
   wherein the second wiring is inserted through a hollow portion of the cylindrical portion.

6. The driving apparatus according to claim 1, further comprising a first driving unit configured to drive the first movable unit,
   wherein the first driving unit is a vibration wave motor that includes a vibrator and a friction member, and
   wherein the wound portion is provided between the bearing and the first driving unit in the radial direction of the bearing.

7. The driving apparatus according to claim 1, further comprising a first driving unit configured to drive the first movable unit,
   wherein the first driving unit is an electromagnetic motor that includes a coil and a magnet, and
   wherein the wound portion is provided outside the first driving unit in the radial direction of the bearing.

8. The driving apparatus according to claim 6, wherein the first driving unit and the wound portion are provided so as to at least partially overlap each other in a direction of the first axis.

9. The driving apparatus according to claim 1, further comprising a second driving unit configured to drive the second movable unit,
   wherein the first wiring transmits a driving signal for driving the second driving unit.

10. The driving apparatus according to claim 1, further comprising a position detecting unit configured to detect a position of the second movable unit,
    wherein the first wiring transmits a position detecting signal of the position detecting unit.

11. The driving apparatus according to claim 1, wherein the driving apparatus is an image pickup apparatus that includes an image sensor,
    wherein the image sensor is provided on the second movable unit, and
    wherein the second wiring transmits a video signal from the image sensor.

12. The driving apparatus according to claim 1, wherein the bearing includes an inner ring having a first rolling surface, an outer ring having a second rolling surface, and balls provided between the first rolling surface and the second rolling surface,
    wherein the inner ring is fixed relative to the first movable unit, and
    wherein the outer ring is fixed relative to the fixed unit.

* * * * *